UNITED STATES PATENT OFFICE.

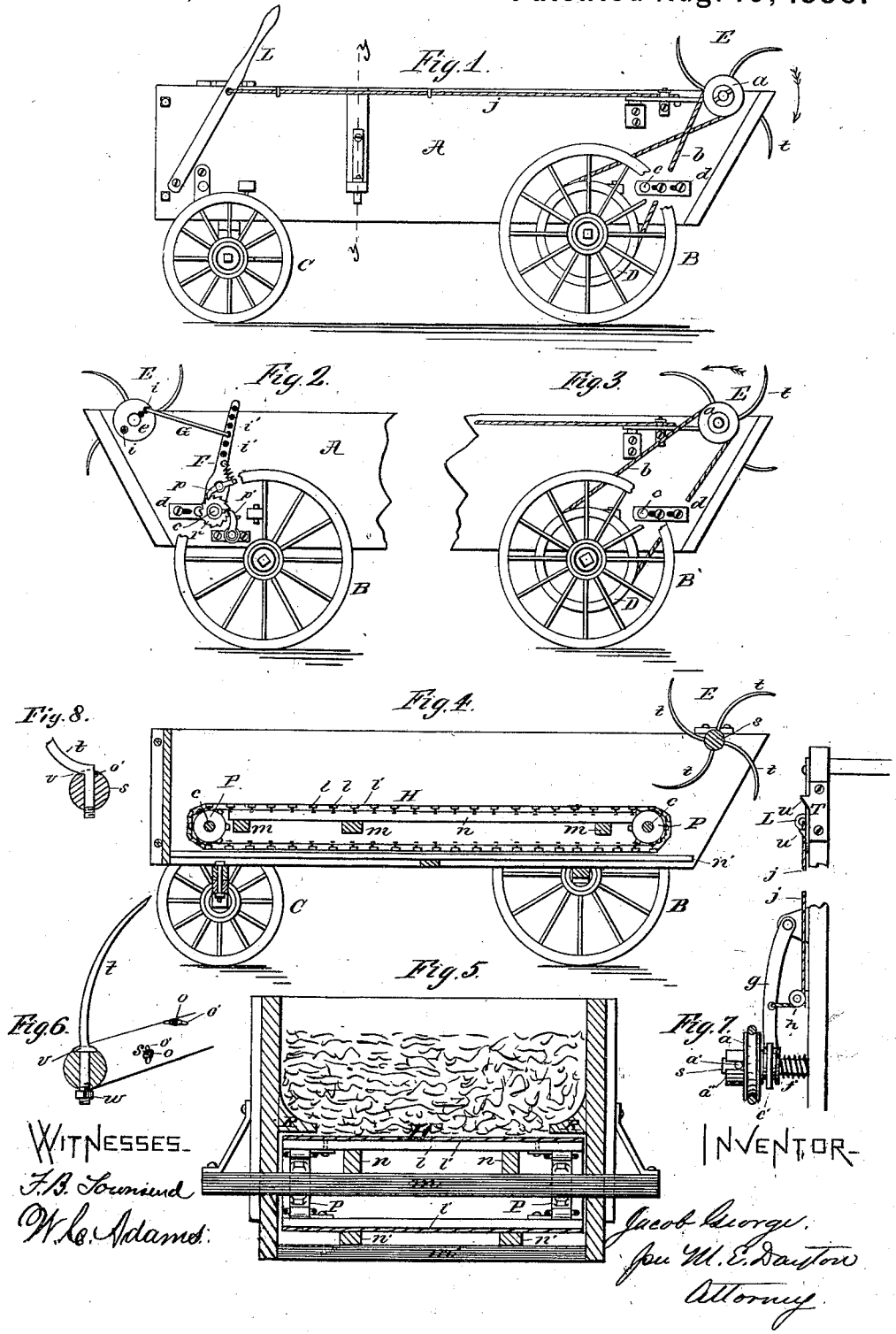
J. GEORGE.
Fertilizer and Manure Distributer.
No. 230,871. Patented Aug. 10, 1880.

JACOB GEORGE, OF NORTH LIBERTY, IOWA.

FERTILIZER AND MANURE DISTRIBUTER.

SPECIFICATION forming part of Letters Patent No. 230,871, dated August 10, 1880.

Application filed February 24, 1880.

*To all whom it may concern:*

Be it known that I, JACOB GEORGE, of North Liberty, in the county of Johnson and State of Iowa, have invented certain new and useful Improvements in Fertilizer and Manure Distributers; and I do hereby declare that the following is a full, clear, and exact description thereof, reference being had to the accompanying drawings, and to the letters of reference marked thereon, which form a part of this specification.

This invention relates to wagons for carrying and distributing manure or fertilizers.

The bed of the wagon is an endless apron mounted on suitable shafts at the ends, and intermediately supported on longitudinal rails sustained from the sides of the box. At the rear open end of the box is mounted a transverse shaft, having its axis higher than the bed, bearing long curved teeth extending to the rear end of the bed, and called the "distributer" or "spreader." Said shaft is actuated from the rear wheel or wheels of the apparatus by a belt or chain, and, in turn, actuates the apron-bed through the medium of a crank-lever and ratchet. The spreader is adapted to be thrown into or out of gear at the pleasure of the driver through a lever at the front end of the box and a spring-clutch on the distributer-shaft suitably connected with said lever.

For barn-yard manure the bare apron-bed, consisting of transverse slats fixed at suitable intervals to sprocket-chains, is used; but in the distribution of lime and pulverulent fertilizers a continuous covering of canvas is put over the slats, movable therewith. In spreading barn-yard manure the spreader-shaft is rotated in the same direction with the bed; but in distributing pulverulent material it is run in the opposite direction.

The teeth of the spreader are made detachable and reversible.

My invention therefore consists, first, in an endless-apron bed and a rotating spreader, with the means for actuating the same; second, in the devices whereby the stroke of the operating-lever and the rapidity of the feed are varied as required.

Other features of the apparatus will be hereinafter described, and those believed to be of my invention will be pointed out in the claims.

Figure 1 is a side elevation of the apparatus. Figs. 2 and 3 are elevations of the opposite rear sides. Fig. 4 is a longitudinal central vertical section. Fig. 5 is a transverse section in the line *y y* of Fig. 1, and Figs. 6, 7, and 8 are details.

A is the box. B are the rear wheels, permanently attached thereto, and C the front wheels, which may be those of an ordinary lumber-wagon transferred to this apparatus when it is to be used.

H (seen in Figs. 4 and 5) is the bed, consisting of the endless apron formed of transverse slats *l l*, secured to marginal chains which engage with the sprocket-wheels P P on the shafts *c*. The rear shaft, *c*, is adjustable by means of the exterior slotted bearing-blocks, *d*, movably fastened to the outside of the box. Between the shafts *c* the apron is sustained upon longitudinal rails *n*, supported by cross-bars *m*.

E is a distributer, consisting of the shaft *s*, mounted across the rear of the box, and having curved teeth *t*, extending nearly to the rear end of the apron. On one end of the shaft *s*, and outside the box A, is a pulley, *a*, taking a driving-belt from the pulley D fixed to the wheel B.

The apron-bed is driven to carry the contents of the wagon backward to be acted upon by the distributer by means of the devices shown in Fig. 2, wherein *r* is a ratchet fixed to the rear shaft, *c*. F is a lever pivoted upon said shaft. G is a rod connecting the lever with the plate *e* upon the shaft *s*. *p* is a pawl, pivoted to the lever F in position to actuate the ratchet *r*, and *p'* is a retaining-pawl fixed to the box, and also engaging said ratchet.

The plate *e* is provided with several holes, *i*, and the lever has also, preferably, a number of holes, *i'*, whereby the stroke of the lever F, and the rapidity of the feed, therefore, may be varied according to the nature of the material or the quantity required to be distributed. The rod G has its ends bent at right angles to enter the holes, and is held in place by nuts or keys.

The bed and distributer are thrown into or out of action at the will of the driver by the following devices: The pulley $a$ is loose, and has longitudinal movement on the shaft $s$, and it engages the pin $a'$ fixed in the shaft by the slotted hub $a''$.

A spring, $f$, interposed between the pulley and the box, serves to maintain engagement of the pulley with the pin, unless the pulley be forcibly thrown inward. For the latter purpose I employ the pivoted lever $g$, engaging at its free end with the collar $c'$ on the pulley $a$, and the hand or foot lever L, in position convenient to the driver, together with the cord $j$ connecting the two, as shown, and running over the pulley $h$ fixed to the box. By throwing the lever L forward the lever $g$ is drawn inward, disconnecting the pulley $a$ from the pin $a'$. A projection, $u$, on the fixed plate T serves to lock the lever to hold the pulley $a$ out of engagement with its shaft.

The teeth $t$ of the spreader are placed, say, six inches apart (more or less) throughout the length of the shaft $s$, between the sides of the box A. They are made detachable and reversible, being preferably provided with a shoulder, $v$, and a shank threaded to receive the nut $w$.

The shaft $s$ may be notched transversely at the holes $o$, as seen at $o'$, Figs. 6 and 8, to admit the shoulder upon the tooth to prevent its turning. A sharp bend in the tooth at $v$ provides a sufficient shoulder for this purpose, as seen in Fig. 8.

In distributing barn-yard manure it is proposed that the spreader E shall rotate in the direction shown in Fig. 1—that is, the lower teeth moving in opposition to the movement of the bed, so that the manure is lifted on the inner teeth and thrown over the spreader. By this means the material is more completely broken and more widely spread.

In spreading pulverized material the distributer is run as shown in Fig. 3, and preferably at a rather high velocity relative to the movement of the bed, in order to thoroughly scatter the same.

For pulverulent substances the slatted bed is covered by an endless apron of canvas, (seen plainly at $l'$ in Fig. 5,) fitting the same closely and carried with it. At the edges and a little above the canvas the rails R R, preferably narrower than indicated, may be either fastened to the box or hung removably therein by rods hooked over the top of the box, for the purpose of preventing the escape of the material.

By removing the spreader E or its teeth the wagon becomes useful in carrying earth in making and repairing roadways.

Having thus described my invention, I claim—

1. The combination, in a fertilizer or manure distributer having an endless-apron bed, of a rotating spreader, a connecting-rod, a pivoted lever, and a ratchet mechanism, substantially as and for the purpose set forth.

2. The combination, with the spreader actuated from the wheel B, and with the endless-apron bed H, of the lever F, ratchet $r$, and pawl $p$, operated from the shaft of the spreader, substantially as described.

3. In combination with the box A and open or slatted bed H, the canvas $l'$, applied to the bed, substantially as and for the purposes set forth.

4. The combination, with a revolving spreader of a fertilizer or manure distributer, of the disk $e$, with adjusting means, pivoted lever F, with adjusting means, and a connecting-rod, whereby the stroke of the operating-lever and the rapidity of the feed are varied according to the nature of the material or the quantity to be distributed, substantially as described.

In testimony that I claim the foregoing as my invention I affix my signature in presence of two witnesses.

JACOB GEORGE.

Witnesses:
M. E. DAYTON,
JESSE COX, Jr.